(12) United States Patent
Nakayama et al.

(10) Patent No.: US 8,379,329 B2
(45) Date of Patent: Feb. 19, 2013

(54) IMAGING OPTICAL SYSTEM, CAMERA AND PERSONAL DIGITAL ASSISTANT

(75) Inventors: Takahiro Nakayama, Yokohama (JP); Yoshifumi Sudoh, Maehida (JP)

(73) Assignee: Ricoh Company, Ltd., Tokyo (JP)

( * ) Notice: Subject to any disclaimer, the term of this patent is extended or adjusted under 35 U.S.C. 154(b) by 127 days.

(21) Appl. No.: 12/861,343

(22) Filed: Aug. 23, 2010

(65) Prior Publication Data

US 2011/0051260 A1    Mar. 3, 2011

(30) Foreign Application Priority Data

Aug. 25, 2009    (JP) ................................ 2009-194668

(51) Int. Cl.
*G02B 9/04* (2006.01)
*G02B 3/08* (2006.01)
*G02B 5/28* (2006.01)

(52) U.S. Cl. ......................... 359/793; 359/740; 359/589
(58) Field of Classification Search .................. 359/584, 359/589, 738, 740
See application file for complete search history.

(56) References Cited

U.S. PATENT DOCUMENTS

| 5,798,872 | A   | 8/1998  | Uzawa        |         |
|-----------|-----|---------|--------------|---------|
| 5,969,878 | A   | 10/1999 | Koizumi      |         |
| 6,560,042 | B2  | 5/2003  | Murata et al.|         |
| 6,891,684 | B2  | 5/2005  | Taki         |         |
| 6,924,941 | B2* | 8/2005  | Okada et al. | 359/738 |
| 7,167,318 | B2  | 1/2007  | Tomioka      |         |
| 7,372,636 | B2  | 5/2008  | Sudoh        |         |
| 7,535,653 | B2  | 5/2009  | Sudoh        |         |
| 7,623,298 | B2  | 11/2009 | Sudoh        |         |
| 7,636,201 | B2  | 12/2009 | Sudoh et al. |         |
| 7,719,773 | B2  | 5/2010  | Atsuumi et al.|        |
| 7,738,031 | B2  | 6/2010  | Shinohara    |         |
| 2003/0174411 | A1 | 9/2003 | Horiuchi    |         |
| 2007/0086772 | A1 | 4/2007 | Shinohara   |         |
| 2008/0278779 | A1 | 11/2008 | Nishina et al. |     |
| 2009/0147375 | A1 | 6/2009 | Sudoh et al.|         |
| 2009/0323200 | A1 | 12/2009 | Sudoh      |         |
| 2010/0027136 | A1 | 2/2010 | Ohashi et al.|        |
| 2010/0027254 | A1 | 2/2010 | Nakayama   |         |

FOREIGN PATENT DOCUMENTS

| EP | 1 734 393 A1 | 12/2006 |
| JP | 6-308385    | 11/1994 |
| JP | 6-324264    | 11/1994 |
| JP | 6-337304 A  | 12/1994 |
| JP | 2000-305018 | 11/2000 |

(Continued)

OTHER PUBLICATIONS

U.S. Appl. No. 12/786,913, filed May 25, 2010, Sudoh, et al.

(Continued)

*Primary Examiner* — Alicia M Harrington
(74) *Attorney, Agent, or Firm* — Oblon, Spivak, McClelland, Maier & Neustadt, L.L.P.

(57) ABSTRACT

An imaging optical system includes an aperture stop, a first lens group disposed on an object side of the aperture stop, a second lens group disposed on an image side of the aperture stop and a plate-like ND filter disposed close to a position of the aperture stop in an optical axis direction of the first and second lens groups, and the second lens group includes positive refracting power as a whole, the ND filter is configured to be retractable from the optical axis, and to attenuate a passing light amount.

16 Claims, 3 Drawing Sheets

FOREIGN PATENT DOCUMENTS

| | | |
|---|---|---|
| JP | 2004-32454 | 1/2004 |
| JP | 2004-61680 | 2/2004 |
| JP | 3629191 | 12/2004 |
| JP | 2005-62771 | 3/2005 |
| JP | 2006-251437 | 9/2006 |
| JP | 2006-301473 | 11/2006 |
| JP | 2006-349920 | 12/2006 |
| JP | 2007-114283 | 5/2007 |
| JP | 2008-28963 | 2/2008 |
| JP | 2010-8577 | 1/2010 |

OTHER PUBLICATIONS

Extended European Search Report issued on Dec. 27, 2010 in corresponding European Application No. 10 25 1488.

* cited by examiner

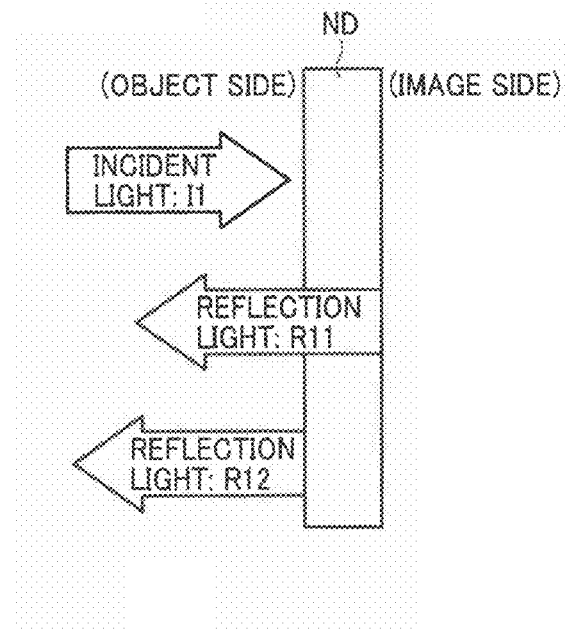
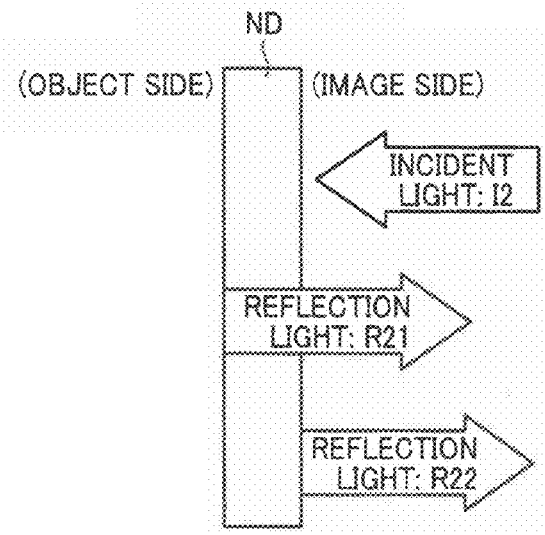
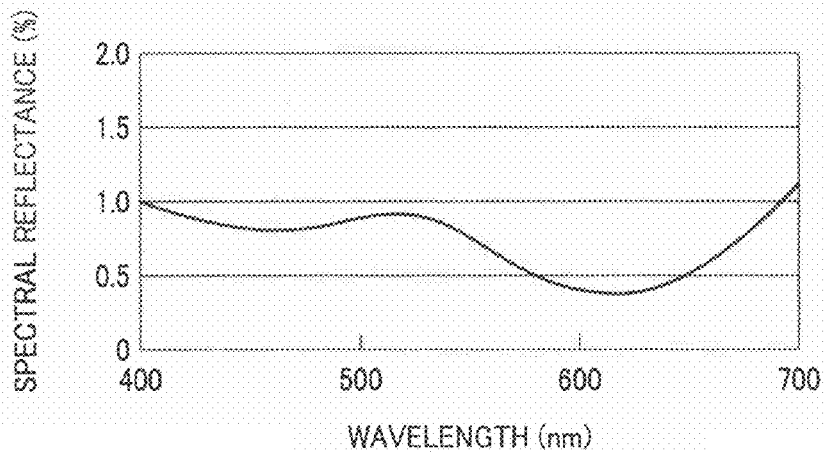

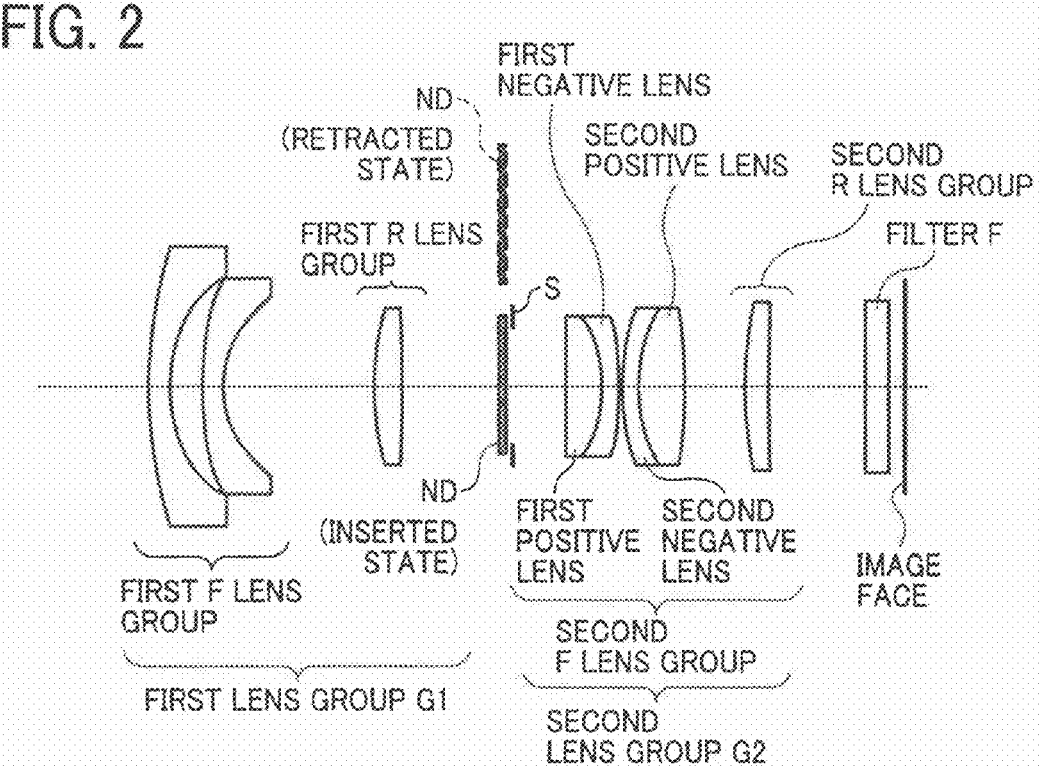
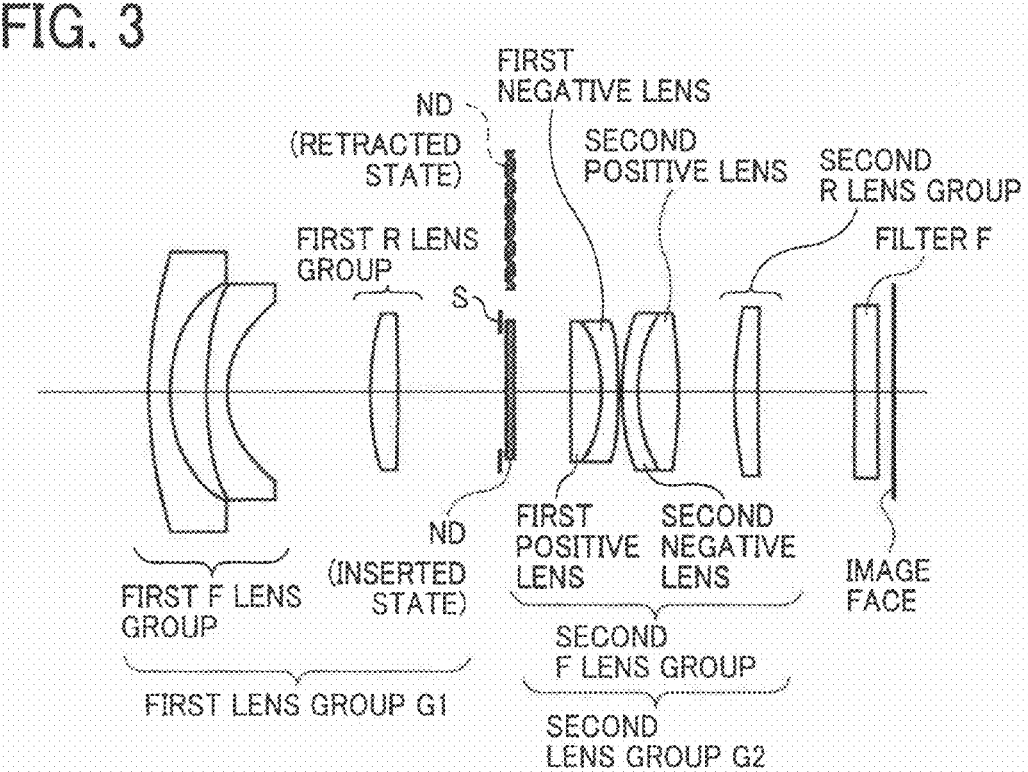

IMAGING OPTICAL SYSTEM, CAMERA AND PERSONAL DIGITAL ASSISTANT

PRIORITY CLAIM

The present application is based on and claims priority from Japanese Patent Application No. 2009-194668, filed on Aug. 25, 2009, the disclosure of which is hereby incorporated by reference in its entirety.

BACKGROUND OF THE INVENTION

1. Field of the Invention

The present invention relates to an imaging optical system, a camera and a personal digital assistant.

An imaging optical system of the present invention can be used as a lens system of a digital camera and a digital video camera, and also can be used as a lens system of a silver salt camera.

Therefore, a camera of the present invention can be used as a digital camera, a digital video camera and a silver salt camera having the imaging optical system of the present invention. A personal digital assistant of the present invention can be used as a personal digital assistant which has a shooting section of the camera of the present invention and can perform information processing using a communication system and the like.

2. Description of the Related Art

In recent years, the use of digital cameras has widely increased, their performances have improved, and their types have diversified. Under such circumstances, many users require a high image quality compact digital camera having a high-performance single focus lens, and also require a compact camera having a small F-number and a large-diameter lens in addition to a high performance.

Meanwhile, in order to use a camera having a small F-number in a lighted environment such as on a fine day, it is necessary to use a high-speed shutter unit.

In many general lens-integrated digital cameras, a shutter is disposed close to an aperture stop, and a smaller F-number, i.e., a larger aperture stop, requires a high-speed operation of a shutter unit. For this reason, in a compact camera having a large-diameter lens, the size of a shutter unit tends to increase, and also the power consumption tends to increase.

In order to avoid such problems, JP2006-301473A, JP2000-305018A, JP2007-114283A and JP2008-028963A propose the use of an ND filter (neutral density filter) for attenuating light amount. According to the inventions proposed in JP2006-301473A, JP2000-305018A, JP2007-114283A and JP2008-028963A, an ND filter is built in a shutter unit, this ND filter is configured to be inserted and retracted on and from the optical axis of the imaging optical system. In general, when the ND filter is not necessary, the ND filter is retracted from the optical axis, and when the ND filter is necessary, the ND filter is disposed on the optical axis, so as to cover the entire aperture stop, and then the shutter is activated in a state in which the shooting light amount is attenuated.

By constituting as described above, appropriately exposed shooting can be performed in a lighted environment without much increasing a shutter speed.

In addition, the shooting light amount can be attenuated without reducing the diameter of the aperture stop, so that the deterioration in the optical performance by the light diffraction generated by reducing the diameter of the aperture stop can be controlled. Moreover, since the diameter of the aperture stop can be increased, shooting with a narrow depth of field can be performed.

Furthermore, by placing the ND filter close to the aperture stop, a driving source and its power source, which are required for inserting and retracting the ND filter on and from the optical axis, can be shared with those of the shutter unit. Also, by placing the ND filter close to the aperture stop, the ND filter covers the entire shooting light flux, so that a large diameter ND filter becomes unnecessary.

However, by placing the ND filter close to the aperture stop, a ghost image may occur by the reflected light from an imaging element side.

SUMMARY OF THE INVENTION

It is, therefore, an object of the present invention to provide an imaging optical system which has a large-diameter lens and a small F-number and can effectively reduce or prevent the generation of a ghost image caused by the use of an ND filter, a camera and a personal digital assistant having the imaging optical system.

In order to achieve the above object, the present invention provides an imaging optical system, including: an aperture stop; a first lens group disposed on an object side of the aperture stop; a second lens group disposed on an image side of the aperture stop; and a plate-like ND filter disposed close to a position of the aperture stop in an optical axis direction of the first and second lens groups, wherein the second lens group includes positive refracting power as a whole, the ND filter is configured to be retractable from the optical axis, and to attenuate a passing light amount, and where each wavelength of which light wavelengths from 400 nm to 700 nm are divided at substantially equal intervals is defined as $\lambda i$ ($i=1\sim n$, where $n \geq 5$), an average reflectance R1 defined by the following expression by a reflection light amount $R11i$ on an object side face of the ND filter and a reflection light amount $R12i$ which emits to the object side by the reflection by an image side face of the ND filter when light having the wavelength $\lambda i$ enters from the object side to the ND filter with an incident light amount of $I1i$ and an average reflectance R2 defined by the following expression by a reflection light amount $R21i$ which exits to the image side by the reflection by the object side face of the ND filter and a reflection light amount $R22i$ on the image side face of the ND filter when the light having the wavelength $\lambda i$ enters the ND filter from the image side with an incident light amount of $I2i$ satisfy the following condition (1).

$$R1 = [\Sigma\{(R11i+R12i)/I1i\}/n \ (i=1\sim n)$$

$$R2 = \Sigma\{(R21i+R22i)/I2i\}/n \ (i=1\sim n)$$

$$R1/R2 > 2.0 \qquad \text{Condition (1)}$$

Moreover, the present invention provides a camera comprising the above imaging optical system.

Furthermore, the present invention provides a personal digital assistant comprising the above camera as a shooting section.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

FIG. 1A is a view describing reflection of incident light from an object side and an image side by an ND filter.

FIG. 1B is a view describing reflection of incident light from the object side and the image side by the ND filter.

FIG. 1C is one example of a spectral feature of the reflected light by the ND filter.

FIG. 2 is a view illustrating one example of an imaging optical system and a constitution in which the ND filter is inserted into the object side of an aperture stop S.

FIG. 3 is a view illustrating another example of an imaging optical system and a constitution in which the ND filter is inserted into the image side of the aperture stop S.

DETAILED DESCRIPTION OF THE PREFERRED EMBODIMENT

Figure 4A:
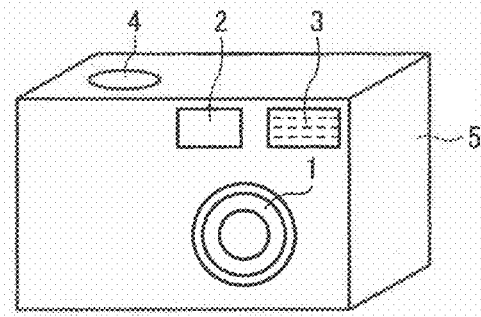
FIG. 4A is a front side perspective view illustrating an embodiment of a personal digital assistant.

Hereinafter, an embodiment of the present invention will be described.

Two embodiments of an imaging optical system are described with reference to FIGS. 2, 3. These embodiments relate to the below-described Embodiments 1, 2. The same reference numbers are used for FIGS. 2, 3. The imaging optical system illustrated in each of FIGS. 2, 3 is a single focus imaging optical system. The imaging optical system includes an aperture stop S, a first lens group G1 disposed on an object side (left side in FIGS. 2, 3) of the aperture stop S and a second lens group G2 disposed on the image side (right side in FIGS. 2, 3) of the aperture stop S.

In these examples, the first lens group G1 is disposed on the object side of the aperture stop S, and includes a first F lens group having negative power, and a first R lens group having positive power. The first F lens group and the first R lens group are disposed to have therebetween the widest space in the first lens group G1.

The first F lens group includes two negative lenses (menisucus lenses each having a concave face on the image side), and the first R lens group includes one positive lens.

The second lens group G2 is disposed on the image side of the aperture stop S. The second lens group G2 includes a second F lens group and a second R lens group. These are disposed in order from the object side.

The second F lens group includes a first positive lens, a first negative lens, a second negative lens and a second positive lens. These are disposed in order from the object side. The first positive lens and the first negative lens have a positive or a negative synthesis focal length. The second negative lens and the second positive lens are cemented as a positive cemented lens. The second F lens group has positive power as a whole.

The second R lens group includes one lens. One lens of the second R lens group in each of the after-described Embodiments 1, 2 is a positive lens.

In the imaging optical system of each of Embodiments 1, 2, a focal length of an entire system f, a focal length of the first lens group f1, an image height Y1 and an eye point distance AP in which the object side of the image face is the negative direction satisfy the below-described conditions (2), (3).

The imaging optical system illustrating each of Embodiments 1, 2 in FIGS. 2, 3 includes an ND filter ND. The ND filter ND is disposed close to the aperture stop S as illustrated in FIGS. 2, 3.

The ND filter ND is built in a not shown shutter unit, and is configured to be inserted and retracted on and from the optical axis by a driving system arranged in the shutter unit.

The ND filter ND is an evaporated-type in which an average transparency of the wavelengths from 400 nm to 700 nm becomes 25%.

This ND filter ND includes a base material made of a transparent PET flat plate of about 0.07 mm thick, a first face (object side face) arranged on one face of the base material and a second face (image side face) arranged on the other face of the base material. The first face (object side face) and the second face (image side face) include different multilayer films, respectively.

A filter F having an infrared and ultraviolet protection face and a low-pass filter is disposed close to the image face of the imaging element between the second lens group G2 and the image face.

Figure 4B:
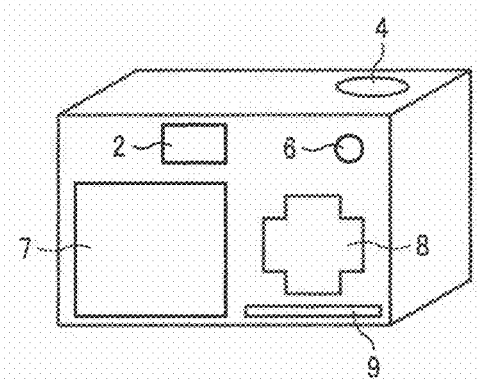
FIG. 4B is a back side perspective view illustrating the embodiment of the personal digital assistant.
Figure 5:
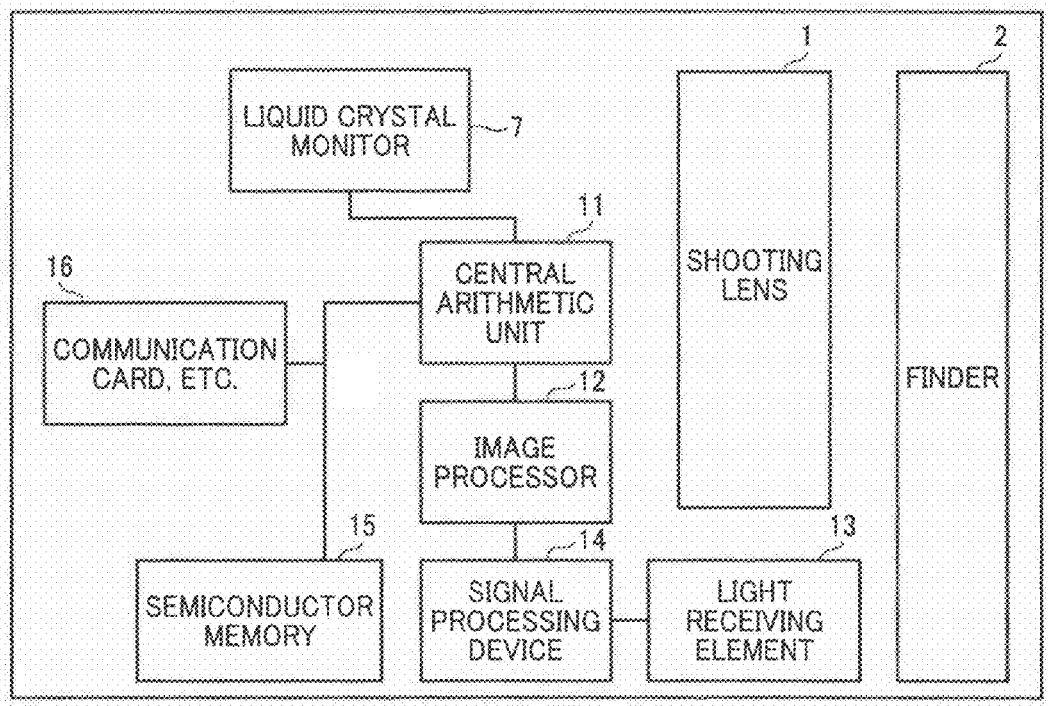
FIG. 5 is a block diagram illustrating one example of a system constitution of the personal digital assistant.

Referring to FIGS. 4A, 4B, 5, one embodiment of a personal digital assistant will be described.

FIG. 4A is a perspective view illustrating the front face side of the personal digital assistant. FIG. 4B is a perspective view illustrating the back face side of the personal digital assistant.

The imaging optical system of the embodiment of the present invention (specifically, one described in Embodiments 1, 2) is used for the personal digital assistant as a shooting lens 1.

In FIGS. 4A, 4B, reference number 2 denotes a finder, reference number 3 denotes a flash, reference number 4 denotes a shutter button, reference number 5 denotes a body case, reference number 6 denotes a power source switch, reference number 7 denotes a liquid crystal display, reference number 8 denotes an operation button and reference number 9 denotes a memory card socket FIG. 5 is a view illustrating one example of the system constitution of the personal digital assistant.

As illustrated in FIG. 5, the personal digital assistant includes a light-receiving element 13 and the shooting lens 1 of the imaging optical system, and is configured to read an image of a shooting object formed by the shooting lens 1 by means of the light-receiving element 13.

The output of the light-receiving element 13 is processed by a signal processing unit 14 controlled by a central arithmetic unit 11, and is converted into digital information. More particularly, the personal digital assistant includes a function which converts a shot image into digital information.

The shot image converted into the digital information is processed by an image processing unit 12 which is controlled by the central arithmetic unit 11. The processed image can be displayed on the liquid crystal display 7 and stored in a semiconductor memory 15. The operation of shooting can be performed by the operation button.

Image data and the like can be sent outside via a communication card 16 and the like. The communication card 16 and the like is stored in the socket 9 as illustrated in FIG. 4B.

The photographing lens 1 is collapsed in the body case 5 in non-shooting, and is extended in shooting if the power source is turned on by the power source switch 6, and is disposed as illustrated in FIGS. 3, 4A, 4B.

A portion except for the communication function by the communication card 16 and the like constitutes a camera which is a shooting section in the personal digital assistant.

Embodiment 1

Hereinafter, a specific embodiment of the imaging optical system illustrated in each of FIGS. 2, 3 will be described.

The meaning of each reference number in Embodiments is as follows.

f: focal length of entire system
F: F-number
ω: half field angle
R: curvature radius
D: surface interval
$N_d$: refractive index
$\nu_d$: Abbe's number
K: conical coefficient of aspherical surface
$A_4$: $4^{th}$ order aspherical surface coefficient
$A_6$: $6^{th}$ order aspherical surface coefficient
$A_8$: $8^{th}$ order aspherical surface coefficient
$A_{10}$: $10^{th}$ order aspherical surface coefficient The aspherical surface is expressed by the following equation using an inverse of paraxial curvature radius (paraxial curvature): C, a height from an optical axis: H, a conical multiplier: k and the above each aspherical surface coefficient.

$$X = CH^2/[1+\sqrt{(1-(1+K)C^2H^2)}] + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} \cdot A_{18} \cdot H^{18}$$

"Glass Type" in Table 1 denotes the names of optical glass types of OHARA, INC., and SUMITA Optical glass, INC.

Embodiment 1

Table 1 illustrates data of each lens and filter according to Embodiment 1.

TABLE 1

Embodiment 1
focal length 6.00
half-field angle 39.09
Fno 1.96

| SURFACE NUMBER | R | D | N | ν | GLASS TYPE | REMARKS | |
|---|---|---|---|---|---|---|---|
| 1 | 25.026 | 1.2 | 1.497 | 81.54 | S-FPL51 | FIRST LENS | FIRST LENS GROUP |
| 2 | 8 | 2.27 | | | | | |
| 3 | 17.5 | 1.2 | 1.51633 | 64.06 | L-BSL7 | SECOND LENS | |
| 4 | 5.073 | 9.62 | | | | | |
| 5 | 18.209 | 1.71 | 1.83481 | 42.71 | S-LAH55 | THIRD LENS | |
| 6 | −88.519 | 6.7 | | | | | |
| 7 | ∞ | 3.5 | — | — | | APERTURE STOP | |
| 8 | ∞ | 2.27 | 1.497 | 81.54 | S-FPL51 | FOURTH LENS | SECOND LENS GROUP |
| 9 | −7.559 | 1 | 1.72151 | 29.23 | S-TIH18 | FIFTH LENS | |
| 10 | −20.637 | 0.2 | | | | | |
| 11 | 12.826 | 1 | 1.65412 | 39.68 | S-NBH5 | SIXTH LENS | |
| 12 | 8.341 | 3.03 | 1.497 | 81.54 | S-FPL51 | SEVENTH LENS | |
| 13 | −26.301 | 3.65 | | | | | |
| 14 | 18.125 | 1.5 | 1.51633 | 64.06 | L-BSL7 | EIGHTH LENS | |
| 15 | 160.356 | 6.07 | | | | | |
| 16 | ∞ | 1.5 | 1.54892 | 69.31 | | FILTER | |
| 17 | ∞ | | | | | | |

"Aspherical Lens Shape Data"
Table 2 illustrates the data of the aspherical lens shape.

TABLE 2

Aspherical Surface

| | K | $A_2$ | $A_4$ | $A_6$ | $A_8$ |
|---|---|---|---|---|---|
| 4 | −0.4 | 0 | −3.8568E−04 | −8.2523E−06 | −1.1521E−07 |

| | $A_{10}$ | $A_{12}$ | $A_{14}$ | $A_{16}$ | $A_{18}$ |
|---|---|---|---|---|---|
| 4 | −2.5946E−09 | −2.7651E−11 | −1.2444E−13 | 2.3642E−15 | −1.1047E−15 |

| | K | $A_2$ | $A_4$ | $A_6$ | $A_8$ | $A_{10}$ |
|---|---|---|---|---|---|---|
| 14 | 0 | 0 | −2.9359E−04 | 2.2462E−06 | −1.6205E−07 | 2.3075E−09 |

In the above aspherical surface marks, for example, "2.3075E-09" means "$2.3075 \times 10^{-9}$". It is the same in the following example.

"Parameter Value of Conditional Expression"

Table 3 illustrates parameter values of conditions (1)-(3).

TABLE 3

| | CONDITIONAL EXPRESSION | R1 | R2 | CALCULATED RESULT |
|---|---|---|---|---|
| (1) | R1/R2 > 2.0 | 4.10 | 0.60 | 6.83 |
| | CONDITIONAL EXPRESSION | f | f1 | CALCULATED RESULT |
| (2) | |f1|/f > 10.0 | 251.01 | 6.00 | 41.84 |
| | CONDITIONAL EXPRESSION | YI | AP | CALCULATED RESULT |
| (3) | 0.27 > YI/AP > −0.27 | 4.80 | −36.45 | −0.132 |

Embodiment 2

Table 4 illustrates data of each lens and filter according to Embodiment 2.

TABLE 4

Embodiment 2
focal length 6.00
half-field angle 39.12°
Fno 1.95

| SURFACE NUMBER | R | D | Nd | vd | GLASS TYPE | REMARKS | |
|---|---|---|---|---|---|---|---|
| 1 | 25.96 | 1.2 | 1.48749 | 70.24 | S-FSL5 | FIRST LENS | FIRST F LENS GROUP |
| 2 | 7.2 | 2.51 | | | | | |
| 3 | 15 | 1.2 | 1.51633 | 64.06 | L-BSL7 | SECOND LENS | |
| 4 | 4.926 | 8.83 | | | | | |
| 5 | 18.357 | 1.76 | 1.804 | 46.57 | S-LAH65 | THIRD LENS | FIRST R LENS GROUP |
| 6 | −46.654 | 6.22 | | | | | |
| 7 | ∞ | 4.26 | — | — | | APERTURE STOP | |
| 8 | 115.069 | 1.99 | 1.497 | 81.54 | S-FPL51 | FOURTH LENS | SECOND F LENS GROUP |
| 9 | −8.3 | 1 | 1.74077 | 27.79 | S-TIH13 | FIFTH LENS | |
| 10 | −21.635 | 0.2 | | | | | |
| 11 | 12.473 | 1 | 1.72047 | 34.71 | S-NBH8 | SIXTH LENS | |
| 12 | 8.433 | 2.51 | 1.497 | 81.54 | S-FPL51 | SEVENTH LENS | |
| 13 | −33.186 | 3.4 | | | | | |
| 14 | 16.892 | 1.5 | 1.51633 | 64.06 | L-BSL7 | EIGHTH LENS | SECOND R LENS GROUP |
| 15 | 108.71 | 5.73 | | | | | |
| 16 | ∞ | 1.5 | 1.54892 | 69.31 | | FILTER | |
| 17 | ∞ | | | | | | |

"Aspherical Lens Shape Data"

Table 5 illustrates aspherical lens shape data.

TABLE 5

Aspherical Surface

| | K | $A_2$ | $A_4$ | $A_6$ | $A_8$ | $A_{10}$ |
|---|---|---|---|---|---|---|
| 4 | −0.89455 | 0 | 6.6197E−05 | −2.2678E−06 | −9.2764E−08 | −1.0794E−09 |
| | K | $A_2$ | $A_4$ | $A_6$ | $A_8$ | $A_{10}$ |
| 14 | 0 | 0 | −3.1109E−04 | 2.2882E−06 | −1.4584E−07 | 1.8406E−09 |

"Parameter Value of Conditional Expression"
Table 6 illustrates parameter values of conditions (1)-(3).

TABLE 6

|     | CONDITIONAL EXPRESSION | R1    | R2     | CALCULATED RESULT |
|-----|------------------------|-------|--------|-------------------|
| (1) | R1/R2 > 2.0            | 11.20 | 0.85   | 13.18             |
|     | CONDITIONAL EXPRESSION | f     | f1     | CALCULATED RESULT |
| (2) | \|f1\|/f > 10.0        | 6.00  | 99.29  | 16.55             |
|     | CONDITIONAL EXPRESSION | YI    | AP     | CALCULATED RESULT |
| (3) | 0.27 > YI/AP > −0.27   | 4.80  | −36.42 | −0.132            |

Although the maximum diameter of the aperture stop is 3.52 mm in Embodiment 1 and 3.49 mm in Embodiment 2, the diameter of the aperture stop is variable.

If shooting is performed outside, for example, in fine weather, under the same exposure amount, an effect which controls a ghost image of EV 1 or more can be obtained in Embodiments 1, 2 according to an estimate of an EV value, relative to the result using a general ND filter (for example, $R1 \approx R2 \approx 0.02$) in which the present invention is not applied.

According to the embodiment of the present invention, the imaging optical system includes the aperture stop, the first and second lens groups and the ND filter.

The first lens group is disposed on the object side of the aperture stop.

The second lens group is disposed on the image side of the aperture stop and includes positive refracting power as a whole.

A focusing optical system includes the above aperture stop and the first and second lens groups.

The ND filter is in a plate-like form. This ND filter is vertically disposed on the optical axis, which is common to the first and second lenses, across the shooting light beam, so as to attenuate the volume of the shooting light beam which has passed through the ND filter.

According to the embodiment of the present invention, the ND filter is insertable and retractable in and from the position on the optical axis. When the ND filter is inserted, the ND filter is disposed in a position close to the position of the aperture stop in the optical axis direction of the first and second lens groups.

Meanwhile, where the average reflectance when the incident light enters from the object side to the ND filter is R1 and the average reflectance when the incident light enters from the image side to the ND filter is R2, the average reflectance R1, R2 of the ND filter is set to satisfy the following condition (1).

$$R1/R2 > 2.0$$

In this regard, the average reflectance R1, R2 in the condition (1) is defined as follows.

More particularly, each wavelength of which the light wavelengths from 400 nm to 700 nm are divided at substantially equal intervals is $\lambda i$ (i=1-n, where n≧5).

The wavelength $\lambda i$ may include 400 nm or 700 nm.

For example, when n=5, the wavelength $\lambda i$ (i=1-5) can be selected such as 400 nm, 475 nm, 550 nm, 625 nm and 700 nm.

In addition, where n=7, the wavelength $\lambda i$ (i=1-7) can be selected such as 400 nm, 460 nm, 520 nm, 580 nm, 640 nm and 700 nm.

In this case, when the light having the wavelength $\lambda i$ and the incident light amount $I1i$ enters the ND filter from the object side, the average reflectance R1 is defined by the following equation by the reflection light amount $R11i$ of the light which returns to the object side by the reflection by the image side face of the ND filter and the reflection light amount $R12i$ of the light which returns to the object side by the reflection by the object side face of the ND filter.

$$R1 = [\Sigma\{(R11i+R12i)/I1i\}]/n \ (i=1\sim n)$$

When the light having the wavelength $\lambda i$ and the incident light amount $I2i$ enters the ND filter from the image side, the average reflectance R2 is defined by the following equation by the reflection light amount $R21i$ of the light which returns to the image side by the reflection by the object side face of the ND filter and the reflection light amount $R22i$ of the light which returns to the image side by the reflection by the image side face of the ND filter.

$$R2 = [\Sigma\{(R21i+R22i)/I2i\}]/n \ (i=1\sim n)$$

The upper limit of the above n value is not especially limited. If n is infinity, the above wavelength $\lambda i$ becomes a continuous wavelength $\lambda i$.

In this case, with respect to the continuous wavelength $\lambda$, if the light intensity of the incident light is defined as $I1(\lambda)$, $I2(\lambda)$ and if the light amount of the reflected light is defined as $R11(\lambda)$, $R12(\lambda)$, $R21(\lambda)$, $R22(\lambda)$ with respect to the continuous wavelength, the above R1, R2 are as follows.

$$R1 = \int [\{(R11(\lambda)/I1(\lambda)\} + \{(R12(\lambda)/I1(\lambda)\}] d\lambda/(\lambda U - \lambda L)$$

$$R2 = \int [\{(R21(\lambda)/I2(\lambda)\} + \{(R22(\lambda)/I2(\lambda)\}] d\lambda/(\lambda U - \lambda L)$$

Where, $\lambda U$ is the wavelength (700 nm) which is the upper limit of integration, and $\lambda L$ is the wavelength (400 nm) which is the lower limit of integration.

In addition, it is preferable for the difference between each maximum value and each minimum value in the wavelength ($\lambda i$ or $\lambda$) in the range of 400 nm-700 nm of R11 (i or ($\lambda$)), R12 (i or ($\lambda$)), R21 (i or ($\lambda$)), R22 (i or ($\lambda$)) to be 85% or less, or 50% or less if possible with respect to each maximum value.

The above average reflectance R1, R2 is described with reference to FIG. 1.

In FIGS. 1A, 1B, reference number ND denotes the ND filter. In these figures, the left side of the ND filter ND is the object side and the right side of the ND filter ND is the image side.

In FIG. 1A, reference number I1 illustrates incident light entering from the object side, and its volume corresponds to the above incident light amount $I1i$.

Reference number R11 illustrates reflected light which returns to the object side by the reflection by the image side face of the ND filter and reference number R12 illustrates reflected light which returns to the object side by the reflection by the object side face of the ND filter. The reflection light amount corresponds to the above reflection light amount $R11i$ and $R12i$.

In FIG. 1B, reference number 12 illustrates incident light entering from the image side, and its light amount corresponds to the above incident light amount I2i.

Reference number R21 illustrates reflected light which returns to the image side by the reflection by the object side face of the ND filter and reference number R22 illustrates reflected light which returns to the image side by the reflection by the image side of the ND filter. The light amount corresponds to the above reflection light amount R21i and R22i.

FIG. 1C illustrates one example of the spectral feature of the reflectance in the wavelengths from 400 nm to 700 nm. For example, when this spectral feature is a spectral feature regarding the incident light entering from the object side, the average reflectance R1 is a value in which this spectral reflectance is averaged with respect to the wavelengths from 400 nm to 700 nm.

Also, when the spectral feature in FIG. 1C is a spectral feature regarding the incident light entering from the image side, the average reflectance R2 is a value in which this spectral reflectance is averaged with respect to the wavelengths from 400 nm to 700 nm.

There is known an ND filter which is formed by using a material in which an organic coloring material or a pigment which absorbs light is kneaded, and an ND filter which is formed by evaporating an optical thin film (multilayer film) on the surface of a transparent base material as a conventionally-known ND filter.

In the evaporated-type ND filter, the spectral reflectance feature of the optical thin film to be formed can be set in advance, so that multilayer films each having a different spectral reflectance feature can be formed on both sides of the plate-like transparent base material.

Therefore, by adjusting the spectral reflectance feature of these optical thin films, the average reflectance R1 to the light entering from the object side and the average reflectance R2 to the light entering from the image side can be easily adjusted to satisfy the above condition (1).

More particularly, by increasing the reflectance of the incident light from one face side while maintaining a desired transmittance as an ND filter, the reflectance of the incident light from the other face side can be reduced.

According to the embodiment of the present invention, the above evaporated type or kneaded-type ND filter using a transparent material such as a glass plate has at least on one side thereof an optical thin film similar to the above, and satisfies the condition (1).

According to the embodiment of the present invention, in the imaging optical system, it is preferable that the focal length f1 of the first lens group and the focal length f of the entire system satisfy the following condition (2).

$$|f1|/f > 10.0$$

According to the embodiment of the present invention, in the imaging optical system, it is also preferable for the image height YI and the eye-point distance AP to satisfy the following condition (3), where the eye-point distance AP having the object side of the image face as a negative value.

$$0.27 > YI/AP > -0.27$$

According to the embodiment of the present invention, the imaging optical system may include one or more plate-like filters between the second lens group and the image face.

According to the embodiment of the present invention, the imaging optical system includes the shutter unit in which the above-described ND filter is provided. The ND filter can be insertable and retractable on and from the optical axis of the imaging optical system.

The camera according to the embodiment of the present invention includes the above-described imaging optical system.

The camera can be used as a silver salt camera. It is preferable that the camera have a function which processes a shot image as digital information. Therefore, the camera of the embodiment of the present invention can be suitably used as a digital camera or a digital video camera.

The camera can be configured such that the imaging optical system is collapsed in non-shooting mood, such as carrying and a part of the lenses forming the imaging optical system are retracted from the optical axis in the collapsed state.

The personal digital assistant according to the embodiment of the present invention includes the above-described camera as a shooting section.

Supplemental explanation will be given as follows.

In the imaging optical system having the above-described configuration according to the embodiment of the present invention, it is necessary to prevent the increase in the diameter of the aperture stop, in order to improve the focusing optical system.

In addition, it is necessary to reduce the correction of the aberration between the first lens group located on the object side of the aperture stop and the second lens group located on the image side of the aperture stop.

More particularly, it is necessary to optimize the power balance of the first and second lens groups.

However, if the focusing optical system is improved by optimizing the power balance of the first and second lens groups, the axial marginal light beam close to the aperture stop can easily become substantially parallel to the optical axis.

For this reason, if the axial marginal light beam entering from the object side enters the image face of the imaging element having high reflectance, or a sealing glass of the imaging element (a sealing glass of a CCD or a CMOS as an imaging element) which can not generally form an antireflection film, the reflected light by this passes through the second lens group in the reverse direction and becomes a light beam substantially parallel to the optical axis, the light beam is reflected again in the image face direction by the surface of the ND filter disposed near the aperture stop, and this reflected light is again focused near the image face, causing an extremely bright ghost image.

Moreover, in a digital camera, in view of a constitution of an area sensor in which each light receiving element has a color filter and a micro-lens, it is preferable for the light beam around the optical axis to enter the above area sensor at an angle close to the vertical to the surface of the sensor by distancing the eye-point position from the image face.

However, if the light beam around the optical axis enters the filters and the surface of the imaging element having relatively high reflectance at an angle close to the vertical, in this case, the reflected light also passes through the second lens group in the reverse direction and becomes a light beam substantially parallel to the optical axis, the light beam is reflected again on the image face side by the surface of the ND filter disposed close to the aperture stop, and the reflected light is again focused in the vicinity of the image face by the second lens group, causing an extremely bright ghost image.

The condition (1) is a condition which effectively controls the generation of such a ghost image.

If the average reflectance R1, R2 of the ND filter does not satisfy the condition (1), the average reflectance R2 of the light which enters the ND filter from the image side and is reflected to the image side is increased relative to the average reflectance R1 of the light which enters the ND filter from the object side and is reflected to the object side. Therefore, the reflection light amount to the image side by the ND filter is increased.

Accordingly, the reflected light is again focused near the image face by the second lens group; thus, an extremely bright ghost image is easily generated.

As described above, the condition (1) is one that effectively controls the generation of a ghost image. A bright ghost image is mainly generated by the light which enters from the image side onto the image side face of the ND filter and is reflected to the image side, so that it is ideal for the average reflectance R2 to be 0, and it is also preferable for the average reflectance R1 to be small and within a range which satisfies the condition (1).

Accordingly, it is preferable for the average reflectance R1 to be about 10% or below or about 2% or below, and it is preferable for the lower limit value of the condition (1) to be 5 or more.

The condition (2) is a condition which secures the performance as the focusing optical system.

The second lens group includes positive refracting power as a whole, and the first lens group may include positive refracting power or negative refracting power as a whole.

If the condition (2) is not satisfied when the refracting power of the first lens group is positive as a whole, the focal length f1 of the first lens group to the focal length of the entire system becomes too shot, and it becomes difficult for the second lens group which should have a major focusing function to have power, and the aberration correction may become insufficient.

If the condition (2) is not satisfied when the refracting power of the first lens group is negative as a whole, the negative refracting power of the first lens group is relatively increased, and the diameter of the aperture stop is excessively increased, so that it becomes difficult to constitute a compact shooting optical system.

In this case, the aberration correction between the first and second lens groups is excessively increased, and the eccentric sensitivity of the lens groups having the aperture stop therebetween may excessively rise.

Moreover, it is necessary to relatively increase the refracting power of the second lens group. The image face curve is easily increased, and large negative distortion is easily generated.

Despite the negative and positive refracting power of the first lens group, if the condition (2) is not satisfied, the aberration correction such as a spherical aberration in the first lens group is excessively increased, and required accuracy to the eccentric and space between the lenses in the first lens group may become too high.

If the condition (3) is not satisfied, the light beam around the light axis enters at a certain angle to the image face. For this reason, the light beam around the optical axis does not enter at an angle close to the vertical to the surface of the area sensor in which each light receiving element has a color filter and a micro-film, and it is not preferable for the constitution of the above area sensor.

As described above, if the light flux around the light axis enters the image face at a certain angle, the effect, which reduces the ghost image by using the ND filter satisfying the condition (1), is reduced.

If the condition (3) is satisfied, the light beam around the optical axis enters the image face at an angle close to the vertical. For this reason, the generation of a ghost image can be effectively reduced even if the ND filter satisfying the condition (1) is used close to the aperture stop.

Since each light receiving element constituting a solid state image sensing device such as a CCD and a CMOS has relatively high sensitivity on an infrared side, if the light receiving element receives an unnecessary infrared beam, it becomes noise in shooting.

Since each light receiving element which constitutes an imaging element has a periodical discrete structure as a whole, it is usual to use a plate-like infrared-cut filter and a low-pass filter which cover the entire of the light receiving element in the imaging optical system.

If the above various plate-like filters are disposed near the image face, the reflected light from this filter face tracks an optical path similar to that of the reflected light from the image face, which generates a ghost image.

However, if the condition (1) is satisfied, the generation of a ghost image resulting from the reflected light from the faces of these various filters can be effectively reduced by the ND filter disposed near the aperture stop.

By placing the ND filter close to the aperture stop, the driving source and the power source required when inserting and retracting the ND filter on and from the optical axis can be shared with those of the shutter unit, so that the imaging optical system can be downsized.

The imaging optical system, as described above, includes the aperture stop, the first lens group disposed on the object side of the aperture stop, the second lens group which has positive power and is disposed on the image side of the aperture stop; however, various constitutions are possible as a specific lens constitution.

As a favorable lens constitution of the imaging optical system, the following constitution can be considered similar to the above Embodiments.

It is preferable for the first lens group to be disposed on the object side of the aperture stop, and to have, in order from the object side, the first F lens group having negative power and the first R lens group having positive power. It is also preferable for the first F lens group and the first R lens group to be disposed so as to have the widest space therebetween in the first lens group.

In this case, the space between the most image side face of the first F lens group and the most object side face of the first R lens group is the largest in the first lens group.

It is preferable for the first F lens group to have at least two negative lenses, and it is preferable for the first R lens group to have at least one positive lens.

It is preferable for the second lens group to be disposed on the image side of the aperture stop, and to have, in order from the object side, the second F lens group and the second R lens group.

In this case, it is preferable for the second F lens group to have, in order from the object side, the first positive lens, the first negative lens, the second negative lens and the second positive lens, and also to have positive power as a whole.

In this case, the first positive lens and the first negative lens have a positive or negative synthesis focal length, and the second negative lens and the second positive lens are cemented as the positive cemented lens.

Namely, the second F lens group is set to have a positive power as a whole by the positive or negative synthesis power of the first positive lens and the first negative lens and the positive synthesis power by the positive cemented lens in which the second negative lens and the second positive lens are cemented.

It is preferable for the second R lens group to have at least one lens.

As described above, according to the embodiment of the present invention, the imaging optical system, which has, as described in Embodiments 1, 2, a good shooting performance, can perform shooting under a lightened environment despite having a small F-number and a large diameter by the use of the ND filter, and effectively reduces the generation of a ghost image resulting from the use of the ND filter, the camera and the portable digital assistant using the imaging optical system can be provided.

Although the embodiments of the present invention have been described above, the present invention is not limited thereto. It should be appreciated that variations may be made in the embodiments described by persons skilled in the art without departing from the scope of the present invention.

What is claimed is:

1. An imaging optical system, comprising:
   an aperture stop;
   a first lens group disposed on an object side of the aperture stop;
   a second lens group disposed on an image side of the aperture stop; and
   a plate-like neutral density filter disposed close to a position of the aperture stop in a direction of an optical axis of the first and second lens groups, wherein
   the second lens group includes positive refracting power as a whole,
   the neutral density filter is configured to be retractable from the optical axis, and to attenuate a passing light amount,
   each wavelength of which light wavelengths from 400 nm to 700 nm are divided at substantially equal intervals is defined as $\lambda i$ (i=1~n, where n≧5),
   the neutral density filter satisfies Condition (1)

$$R1/R2 > 2.0 \qquad \text{Condition (1),}$$

R1 is an average reflectance on an object side face of the neutral density filter calculated according to Equation (1)

$$R1 = [\Sigma\{(R11i + R12i/I1i)\}]/n \ (i=1\sim n) \qquad \text{Equation (1),}$$

I1$i$ is an amount of light incident upon an object side face of the neutral density filter having the wavelength $\lambda i$,
   R11$i$ is a portion of the amount of light incident upon the object side face of the neutral density filter (I1$i$) that is reflected from an image side face of the neutral density filter,
   R12$i$ is a portion of the amount of light incident upon the object side face of the neutral density filter (I1$i$) that is reflected from the object side face of the neutral density filter,
   R2 is an average reflectance on an image side of the neutral density filter calculated according to Equation (2)

$$R2 = [\Sigma\{(R21i + R22i)/I2i\}]/n \ (i=1\sim n) \qquad \text{Equation (2),}$$

I2$i$ is an amount of light incident upon the image side face of the neutral density filter having the wavelength $\lambda i$,
   R21$i$ is a portion of the amount of light incident upon the image side face of the neutral density filter (I2$i$) that is reflected from the object side face of the neutral density filter, and
   R22$i$ is a portion of the amount of light incident upon the image side face of the neutral density filter (I2$i$) that is reflected from the image side face of the neutral density filter.

2. The imaging optical system according to claim 1, wherein a focal length f1 of the first lens group and a focal length f of an entire system satisfy the following condition (2):

$$|f1|/f > 10.0. \qquad \text{Condition (2)}$$

3. The imaging optical system according to claim 2, wherein an image height Y1 and a distance from an image face to an exit pupil AP in which the object side of the image face is a negative direction satisfy the following condition (3):

$$0.27 > Y1/AP > -0.27. \qquad \text{Condition (3)}$$

4. The imaging optical system according to claim 1, comprising a plate-like filter between the second lens group and the image face.

5. The imaging optical system according to claim 1, wherein
   the neutral density filter is built in a shutter unit disposed close to the aperture stop, and the neutral density filter can be disposed on the optical axis and is retractable from the optical axis.

6. A camera comprising the imaging optical system according to claim 1.

7. The camera according to claim 6, comprising a function which converts a shot image into digital information.

8. A personal digital assistant comprising the camera according to claim 7 as a shooting section.

9. The imaging optical system according to claim 1, wherein the aperture stop is separated from the neutral density filter by a first distance along the optical axis.

10. The imaging optical system according to claim 1, wherein the first lens group includes a first F lens group having a negative power, and a first R lens group having a positive power.

11. The imaging optical system according to claim 10, wherein
    the first F lens group includes two negative lenses, and
    the first R lens group includes one positive lens.

12. The imaging optical system according to claim 10, wherein
    the second lens group includes a second F lens group and a second R lens group, and
    the second F lens group includes, in order along the optical axis in a direction from the first lens group toward the second lens group, a first positive lens, a first negative lens, a second negative lens, and a second positive lens.

13. The imaging optical system according to claim 12, wherein the second negative lens and the second positive lens are cemented together to form a positive cemented lens.

14. The imaging optical system according to claim 12, wherein second R lens group includes a third positive lens.

15. The imaging optical system according to claim 1, wherein the neutral density filter is disposed on an object side of the aperture stop.

16. The imaging optical system according to claim 1, wherein the neutral density filter is disposed on an image side of the aperture stop.

* * * * *